US010883435B2

(12) United States Patent
Deb et al.

(10) Patent No.: US 10,883,435 B2
(45) Date of Patent: *Jan. 5, 2021

(54) METHOD AND ENGINE CONTROLLER FOR DIAGNOSING WASTE GATE VALVE MALFUNCTION AND RELATED POWER GENERATION SYSTEM

(71) Applicant: AI ALPINE US BIDCO INC, Wilmington, DE (US)

(72) Inventors: Dipankar Deb, Karnataka (IN); Sharath Sridhar Aramanekoppa, Karnataka (IN); Prashant Srinivasan, Karnataka (IN); Maruthi Narasinga Rao Devarakonda, Waukesha, WI (US)

(73) Assignee: AI ALPINE US BIDCO INC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/546,264

(22) Filed: Aug. 20, 2019

(65) Prior Publication Data
US 2020/0049093 A1 Feb. 13, 2020

Related U.S. Application Data

(63) Continuation of application No. 15/272,474, filed on Sep. 22, 2016, now Pat. No. 10,385,794.

(30) Foreign Application Priority Data

Sep. 24, 2015 (IN) .......................... 5111/CHE/2015

(51) Int. Cl.
*F02D 41/22* (2006.01)
*F02D 41/00* (2006.01)
(Continued)

(52) U.S. Cl.
CPC ........ *F02D 41/221* (2013.01); *F02B 29/0425* (2013.01); *F02B 37/18* (2013.01);
(Continued)

(58) Field of Classification Search
CPC ............... F02D 41/221; F02D 41/0007; F02D 2009/0228; F02D 2009/0227;
(Continued)

(56) References Cited

U.S. PATENT DOCUMENTS 7,677,227 B2 3/2010 Sagisaka et al.
7,775,043 B2 8/2010 Funke et al.
(Continued)

FOREIGN PATENT DOCUMENTS

WO 2014054453 A1 4/2014

OTHER PUBLICATIONS

Andersson et al., "Intake Air Dynamics on a Turbocharged SI-Engine with Wastegate", Linkoping studies in science and technology, pp. 1-71, 2002.
(Continued)

*Primary Examiner* — Brandon D Lee
(74) *Attorney, Agent, or Firm* — Fletcher Yoder, P.C.

(57) ABSTRACT

A method for diagnosing a waste gate valve malfunction in a power generation system is presented. The method includes determining an actual pressure differential across a throttle valve. The method further includes determining an estimated pressure differential across the throttle valve based on one or more first operating parameters of the power generation system. Furthermore, the method includes determining an absolute difference between the actual pressure differential and the estimated pressure differential. Moreover, the method also includes comparing the absolute difference with a threshold value and if the absolute difference is greater than the threshold value, determining an
(Continued)

operating condition of the throttle valve. Additionally, the method includes determining whether the waste gate valve has malfunctioned based on the determined operating condition of the throttle valve. An engine controller and a power generation system employing the method are also presented.

20 Claims, 5 Drawing Sheets

(51) Int. Cl.
*F02M 35/10* (2006.01)
*F02B 29/04* (2006.01)
*F02B 37/18* (2006.01)
*F02B 39/16* (2006.01)
*F02D 9/02* (2006.01)
*F02D 11/00* (2006.01)
*F02D 11/10* (2006.01)

(52) U.S. Cl.
CPC ............ *F02B 37/186* (2013.01); *F02B 39/16* (2013.01); *F02D 41/0007* (2013.01); *F02M 35/1038* (2013.01); *F02M 35/10157* (2013.01); *F02D 11/106* (2013.01); *F02D 11/107* (2013.01); *F02D 2009/0227* (2013.01); *F02D 2009/0228* (2013.01); *F02D 2200/0402* (2013.01); *F02D 2200/0404* (2013.01); *F02D 2200/0406* (2013.01); *F02D 2200/703* (2013.01)

(58) Field of Classification Search
CPC ............... F02D 11/106; F02D 11/107; F02D 2200/0402; F02D 2200/0404; F02D 2200/0406; F02D 2200/703; F02M 35/10157; F02M 35/1038; F02B 29/0425; F02B 37/186; F02B 39/16; F02B 37/18
See application file for complete search history.

(56) References Cited

U.S. PATENT DOCUMENTS

| | | | |
|---|---|---|---|
| 7,913,674 | B2 | 3/2011 | Tsuda et al. |
| 9,890,718 | B2 | 2/2018 | Tsunooka |
| 2006/0116808 | A1 | 6/2006 | Tanaka |
| 2009/0048802 | A1 | 2/2009 | Wang et al. |
| 2012/0185157 | A1 | 7/2012 | Tsunooka |
| 2012/0209496 | A1 | 8/2012 | Miyashita |
| 2012/0310508 | A1 | 12/2012 | Donar et al. |
| 2014/0182288 | A1 | 7/2014 | Stellwagen |
| 2014/0325982 | A1 | 11/2014 | Maruo et al. |
| 2015/0039206 | A1 | 2/2015 | Storch et al. |
| 2015/0122234 | A1 | 5/2015 | Tanaka |
| 2016/0010572 | A1* | 1/2016 | Tsutsuji ............... F02D 41/221 123/564 |
| 2016/0084176 | A1 | 3/2016 | Yokono et al. |
| 2016/0206981 | A1 | 7/2016 | Pursifull |
| 2016/0215685 | A1 | 7/2016 | Flavin et al. |

OTHER PUBLICATIONS

Wang et al., "Exhaust Pressure Estimation and Its Application to Variable Geometry Turbine and Wastegate Diagnostics", 2010 American Control Conference Marriott Waterfront, Baltimore, MD, USA, pp. 658-663, 2010.

Salehi et al."Detection and isolation of faults in the exhaust path of turbocharged automotive engines", International Journal of Automotive Technology, vol. 16, Issue 1, pp. 127-138, Feb. 2015.

* cited by examiner

METHOD AND ENGINE CONTROLLER FOR DIAGNOSING WASTE GATE VALVE MALFUNCTION AND RELATED POWER GENERATION SYSTEM

CROSS-REFERENCE TO RELATED APPLICATIONS

This application is a continuation of U.S. application Ser. No. 15/272,474, filed Sep. 22, 2016, entitled "METHOD AND ENGINE CONTROLLER FOR DIAGNOSING WASTE GATE VALVE MALFUNCTION AND RELATED POWER GENERATION SYSTEM," which is hereby incorporated by reference in its entirety, and which claims priority to IN Application No. 5111/CHE/2015, filed Sep. 24, 2015, entitled "METHOD AND ENGINE CONTROLLER FOR DIAGNOSING WASTE GATE VALVE MALFUNCTION AND RELATED POWER GENERATION SYSTEM," which is hereby incorporated by reference in its entirety.

BACKGROUND

Embodiments of the invention relate to a method and a system for diagnosing a waste gate valve malfunction in a power generation system. More particularly, embodiments of the invention relate to a method and an engine controller capable of diagnosing the waste gate valve malfunction based on an operating condition of a throttle valve, and related power generation system.

Combustion engines such as internal combustion (IC) engines are used in a wide range of applications. Typically, a power generation system employing such a combustion engine is equipped with a turbocharger that improves an overall performance of the power generation system. In general, the turbocharger includes a compressor and a turbine mechanically coupled to the compressor via a shaft. An exhaust gas generated by the combustion engine drives the turbine which in-turn drives the compressor via the shaft. When driven, the compressor pressurizes an intake air to generate a pressurized air. The pressurized air typically flows into the combustion engine through a throttle valve and an intake manifold.

Typically, one or both of an amount of compression of the intake air (for example, a percentage compression or a compression ratio) and a rotational speed of the turbine defines an output of the turbocharger. Controlling the output of the turbocharger to obtain a desired engine performance may be desirable. For example, a high output from the turbocharger may result in erratic engine performance and may permanently damage engine's components. Whereas, a lower output from the turbocharger may result in engine hesitation and loss of power.

The output of the turbocharger may be controlled by employing a waste gate valve in the power generation system. Typically, the waste valve is fluidly coupled between the exhaust manifold and an exhaust pipe. The waste gate is operated such that at least a portion of the exhaust gas bypasses the turbocharger. Accordingly, by appropriately controlling an amount of the exhaust gas that bypasses the turbocharger, a rotational speed of the turbine of the turbocharger is controlled to achieve a controlled turbocharger output.

Therefore, malfunctioning of the waste gate valve may adversely impact the engine performance, power output, and fuel economy. Waste gate valves which are coupled fluidly, typically do not contain electronic sensors for detection of malfunction. Absence of the electronic sensors makes it challenging to detect malfunction of the waste gate valve. Thus, there is a need for a method and a system for diagnosing the waste gate valve malfunction.

BRIEF DESCRIPTION

One embodiment of the invention is directed to a method for diagnosing a waste gate valve malfunction in a power generation system. The method includes determining an actual pressure differential across a throttle valve. The method further includes determining an estimated pressure differential across the throttle valve based on one or more first operating parameters of the power generation system. Furthermore, the method includes determining an absolute difference between the actual pressure differential and the estimated pressure differential. Moreover, the method also includes comparing the absolute difference between the actual pressure differential and the estimated pressure differential with a threshold value. If the absolute difference between the actual pressure differential and the estimated pressure differential is greater than the threshold value, the method further includes determining an operating condition of the throttle valve, and determining whether the waste gate valve has malfunctioned based on the determined operating condition of the throttle valve.

Another embodiment of the invention is directed to an engine controller for diagnosing a waste gate valve malfunction in a power generation system. The engine controller includes a memory storing one or more processor-executable routines. The engine controller further includes one or more processors to execute the one or more processor-executable routines which, when executed, cause acts to be performed. The acts to be performed include determining an actual pressure differential across a throttle valve. The acts to be performed further include determining an estimated pressure differential across the throttle valve based on one or more first operating parameters of the power generation system. Furthermore, the acts to be performed include determining an absolute difference between the actual pressure differential and the estimated pressure differential. Moreover, the acts to be performed also include comparing the absolute difference between the actual pressure differential and the estimated pressure differential with a threshold value. If the absolute difference between the actual pressure differential and the estimated pressure differential is greater than the threshold value, the acts to be performed further include determining an operating condition of the throttle valve, and determining whether the waste gate valve has malfunctioned based on the determined operating condition of the throttle valve.

Yet another embodiment of the invention is directed to a power generation system. The power generation system includes a combustion engine disposed between an intake manifold and an exhaust manifold. The power generation system further includes a waste gate valve disposed downstream of the exhaust manifold and in fluid communication with the exhaust manifold. Furthermore, the power generation system also includes a throttle valve disposed upstream of the intake manifold. Moreover, the power generation system includes an engine controller operatively coupled to the throttle valve. The engine controller includes a memory storing one or more processor-executable routines. The engine controller further includes one or more processors to execute the one or more processor-executable routines which, when executed, cause acts to be performed. The acts to be performed include determining an actual pressure differential across a throttle valve. The acts to be performed further include determining an estimated pressure differential across the throttle valve based on one or more first operating parameters of the power generation system. Furthermore, the acts to be performed include determining an absolute difference between the actual pressure differential and the estimated pressure differential. Moreover, the acts to be performed also include comparing the absolute difference between the actual pressure differential and the estimated pressure differential with a threshold value. If the absolute difference between the actual pressure differential and the estimated pressure differential is greater than the threshold value, the acts to be performed further include determining an operating condition of the throttle valve, and determining whether the waste gate valve has malfunctioned based on the determined operating condition of the throttle valve.

BRIEF DESCRIPTION OF THE DRAWINGS

These and other features, aspects, and advantages of the present specification will become better understood when the following detailed description is read with reference to the accompanying drawings in which like characters represent like parts throughout the drawings, wherein.

DETAILED DESCRIPTION

Figure 1:
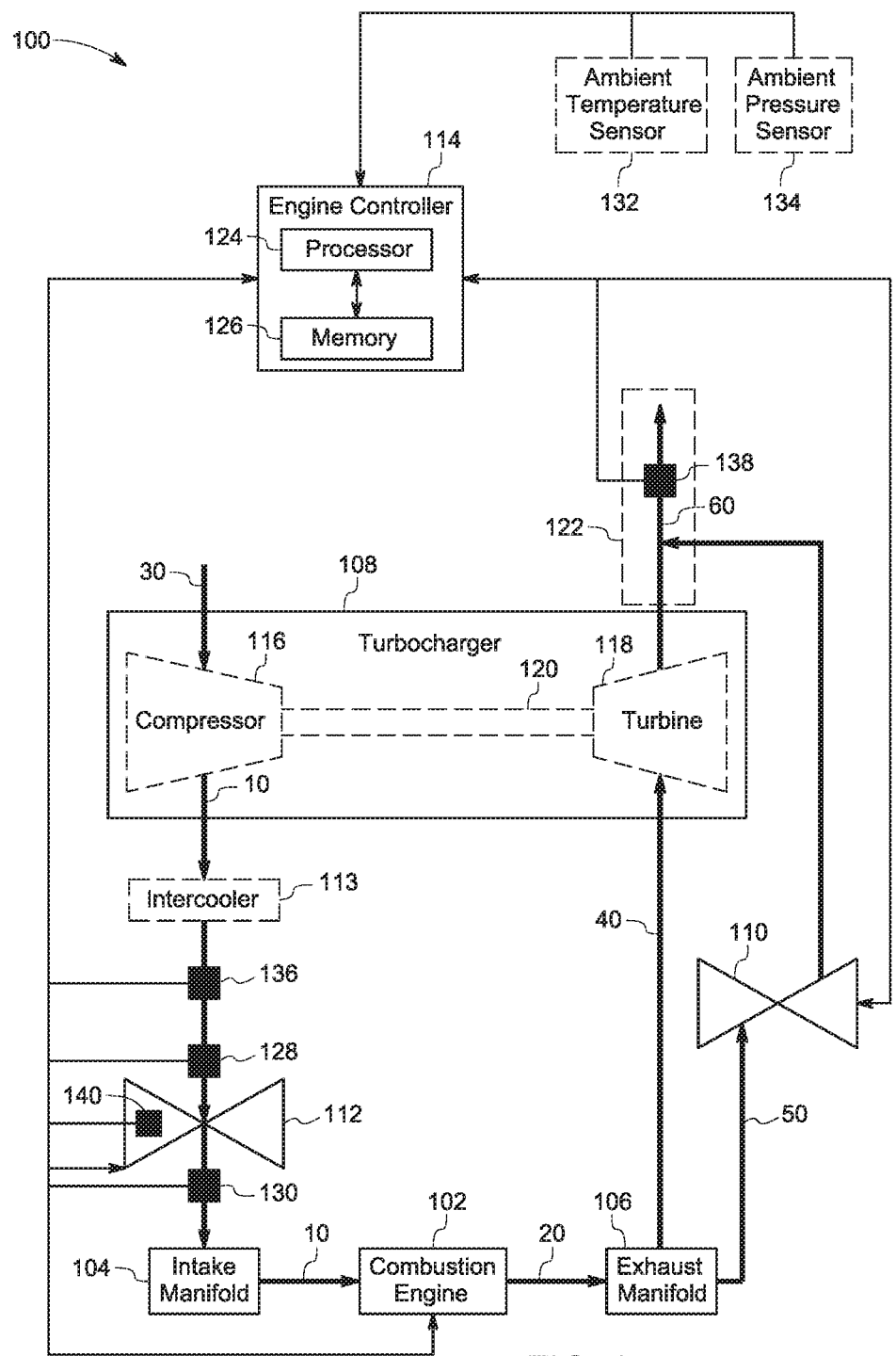
FIG. 1 is a diagrammatical illustration of a power generation system, in accordance with one embodiment of the invention.

The specification may be best understood with reference to the detailed figures and description set forth herein. Various embodiments of the invention are described hereinafter with reference to the figures. However, those skilled in the art will readily appreciate that the detailed description given herein with respect to these figures is for explanatory purposes as the method and the system may extend beyond the described embodiments of the invention.

Unless defined otherwise, technical and scientific terms used herein have the same meaning as is commonly understood by one of ordinary skill in the art to which this disclosure belongs. In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage; while taking into account that in some circumstances, the modified term may sometimes not be appropriate, capable, or suitable.

Approximating language, as used herein throughout the specification and claims, may be applied to modify any quantitative representation that could permissibly vary without resulting in a change in the basic function to which it is related. Accordingly, a value modified by a term or terms, such as "about", and "substantially" is not to be limited to the precise value specified. Here and throughout the specification and claims, range limitations may be combined and/or interchanged; such ranges are identified and include all the sub-ranges contained therein unless context or language indicates otherwise.

Some embodiments of the invention are directed to a method of diagnosing a waste gate valve malfunction and a related power generation system. Also, an engine controller for aiding in diagnosing the waste gate valve malfunction is presented, in some embodiments of the invention.

In accordance with some embodiments of the invention, the power generation system includes a combustion engine disposed between an intake manifold and an exhaust manifold. The power generation system further includes a waste gate valve disposed downstream of the exhaust manifold and in fluid communication with the exhaust manifold. Furthermore, the power generation system includes a throttle valve disposed upstream of the intake manifold. Moreover, the power generation system includes an engine controller operatively coupled to the throttle valve. The engine controller includes a memory storing one or more processor-executable routines. The engine controller further includes one or more processors to execute the one or more processor-executable routines which, when executed, cause acts to be performed. The acts to be performed include determining an actual pressure differential across a throttle valve. The acts to be performed further include determining an estimated pressure differential across the throttle valve based on one or more first operating parameters of the power generation system. Furthermore, the acts to be performed include determining an absolute difference between the actual pressure differential and the estimated pressure differential. Moreover, the acts to be performed also include comparing the absolute difference between the actual pressure differential and the estimated pressure differential with a threshold value. If the absolute difference between the actual pressure differential and the estimated pressure differential is greater than the threshold value, the acts to be performed include determining an operating condition of the throttle valve. Additionally, the acts to be performed include determining whether the waste gate valve has malfunctioned based on the determined operating condition of the throttle valve.

FIG. 1 is a diagrammatical illustration of a power generation system 100, in accordance with one embodiment of the invention. As illustrated in FIG. 1, in some embodiments of the invention, the power generation system 100 may include a combustion engine 102, an intake manifold 104, an exhaust manifold 106, a turbocharger 108, a waste gate valve 110, a throttle valve 112, and an engine controller 114. The engine controller 114 may be operably coupled (as shown by bi-directional arrows) to a throttle valve 112 for diagnosing the waste gate valve 110 malfunction in the power generation system 100.

The combustion engine 102 may be an internal combustion (IC) engine, in some embodiments. In some embodiments of the invention, the combustion engine 102 may include one or more cylinders (not shown). Each cylinder of the one or more cylinders may include a combustion chamber, a piston, and a crankshaft mechanically coupled to the piston. Further, in some embodiments of the invention, the combustion engine 102 may also include one or more fuel injectors (not shown) to inject one or more fuels directly into the combustion chamber. Accordingly, the injected one or more fuels may be combusted with a pressurized air stream 10 (described later). Injection of the one or more fuels into the combustion engine 102 may be controlled by the engine controller 114 by controlling the one or more fuel injectors. Furthermore, injection of the pressurized air stream 10 into the combustion engine 102 may be controlled by the engine controller 114 by controlling an intake valve (not shown).

In some embodiments of the invention, the one or more fuels may be injected into the intake manifold 104 (for example, using a carburetor) upstream of the combustion chamber. Accordingly, an air-fuel mixture may be created in the intake manifold 104. The injection of the air-fuel mixture into the combustion engine 102 may be controlled by the engine controller 114 by controlling the intake valve. Accordingly, in such a configuration, the air-fuel mixture may enter into the combustion chamber for combustion.

In response to the combustion of the fuels in the combustion engine 102, a reciprocating motion of the piston may be enabled. The piston may be mechanically coupled to the crankshaft such that a reciprocating motion of the piston is converted into a rotational motion of the crankshaft. Accordingly, in one embodiment of the invention, the power generation system 100 may generate a mechanical power in the form of the rotational motion of the crankshaft using a chemical energy of the one or more fuels. Combustion residues or by-products of the combustion may be discharged from the combustion engine 102 as an exhaust gas stream 20 via the exhaust manifold 106.

In some embodiments of the invention, the turbocharger 108 may be fluidly coupled between the exhaust manifold 106 and the intake manifold 104. The turbocharger 108 includes the compressor 116 and the turbine 118 mechanically coupled to each other via a shaft 120. At least a portion (for example, a turbine stream 40) of the exhaust gas stream 20 may drive (for example, rotate) the turbine 118 which in-turn may drive the compressor 116 via the shaft 120. When driven, the compressor 116 may pressurize an intake air stream 30 to generate the pressurized air stream 10.

In certain embodiments of the invention, a supply of the pressurized air stream 10 to the intake manifold 104 may be controlled via the throttle valve 112. As depicted in FIG. 1, the throttle valve 112 may be disposed in a fluid path between the turbocharger 108 (more particularly, a compressor output) and the intake manifold 104. The throttle valve 112 may be controlled by the engine controller 114 to control the supply of the pressurized air stream 10 (or the air-fuel mixture) to the intake manifold 104.

In some embodiments, the power generation system 100 may also employ the waste gate valve 110 to control an operation of the turbocharger 108. In some embodiments of the invention, the waste gate valve 110 may be fluidly coupled to the exhaust manifold 106 and an exhaust pipe 122. The waste gate valve 110 may be controlled such that at least a portion (hereinafter referred to as a bypass exhaust stream 50) of the exhaust gas stream 20 bypasses the turbocharger 108 and enters into the exhaust pipe 122. In some embodiments of the invention, the output of the turbocharger 108 (for example, an air stream percentage compression, an intake air stream compression ratio, or a rotational speed of the turbine 118) may be inversely proportional to an amount of the bypass exhaust stream 50.

Accordingly, the output of the turbocharger 108 may be controlled by controlling the amount of the bypass exhaust stream 50.

Further, in some embodiments of the invention, an open position of the waste gate valve 110 may also affect an actual pressure differential across the throttle valve 112. Accordingly, in certain embodiments, the open position of the waste gate valve 110 is controlled so as to maintain certain baseline actual pressure differential across the throttle valve 112. During operation of the power generation system 100, the actual pressure differential across the throttle valve 112 may vary depending on operating parameters including, but not limited to, an engine speed or an engine load. Consequently, in case of malfunctioning of the waste gate valve 110, for a given engine speed or engine load, the actual pressure differential across the throttle valve 112 may be different when compared to the actual pressure differential across the throttle valve 112 when the waste gate valve 110 is operating normally. In such embodiments, if the throttle valve 112 is functioning normally, a variance in pressure differential across the throttle valve 112 may be an indication of waste gate valve malfunction in that the waste gate valve 110 is not able to perform its normal function of maintaining the baseline actual pressure differential.

Furthermore, in some embodiments of the invention, the power generation system 100 may optionally include an intercooler 113 disposed downstream of the turbocharger 108 and upstream of the throttle valve. More particularly, the intercooler 113 may be fluidly coupled to an output of the compressor 116 of the turbocharger 108. In a non-limiting example, the intercooler 113 may be fluidly coupled between the compressor output and the throttle valve 112. The intercooler 113 may reduce the temperature of the pressurized air generated by the compressor 116.

As noted earlier, the engine controller 114 may diagnose the waste gate valve malfunction in the power generation system 100, in some embodiments. The engine controller 114 may include one or more processors, such as, a processor 124. The processor 124 may include a specially programmed general purpose computer, a microprocessor, a digital signal processor, and a microcontroller. Examples of the processor 124 may include, but are not limited to, a reduced instruction set computing (RISC) architecture type processor or a complex instruction set computing (CISC) architecture type processor. Further, the processor 124 may be a single-core processor or a multi-core processor. The processor 124 may also include, or, has electrically, coupled thereto, one or more input/output ports.

The engine controller 114 may further include a memory 126 accessible by the processor 124. In one embodiment of the invention, the memory 126 may be integrated into the processor 124. In another embodiment of the invention, the memory 126 may be external to the processor 124 and electrically coupled to the processor 124, as depicted in FIG. 1. The memory 126 may be a non-transitory computer-readable media. The non-transitory computer-readable media may include tangible, computer-readable media, including, without limitation, non-transitory computer storage devices. The non-transitory computer storage devices may include, but are not limited to, volatile and non-volatile media, and removable and non-removable media such as a firmware, physical and virtual storage, a compact disc read only memory (CD-ROM), or a digital versatile disc (DVD). The non-transitory computer storage devices may also include digital source such as a network or the Internet, as well as yet to be developed digital means, with the sole exception being a transitory, propagating signal. Other non-limiting examples of the memory 126 include a dynamic random access memory (DRAM) device, a static random access memory (SRAM) device, and a flash memory.

The memory 126 may store processor-executable routines that are executable by the processor 124. The processor-executable routines, when executed by the processor 124, may cause acts to be performed that contribute to methods described below as well as other variants that are anticipated, but not specifically listed. In a non-limiting example, processor-executable routines may be implemented in a variety of programming languages, including but not limited to C, C++, or Java. In some embodiments of the invention, by executing one or more of the processor-executable routines, the processor 124 may aid in diagnosing the waste gate valve malfunction in the power generation system 100.

Figure 2:
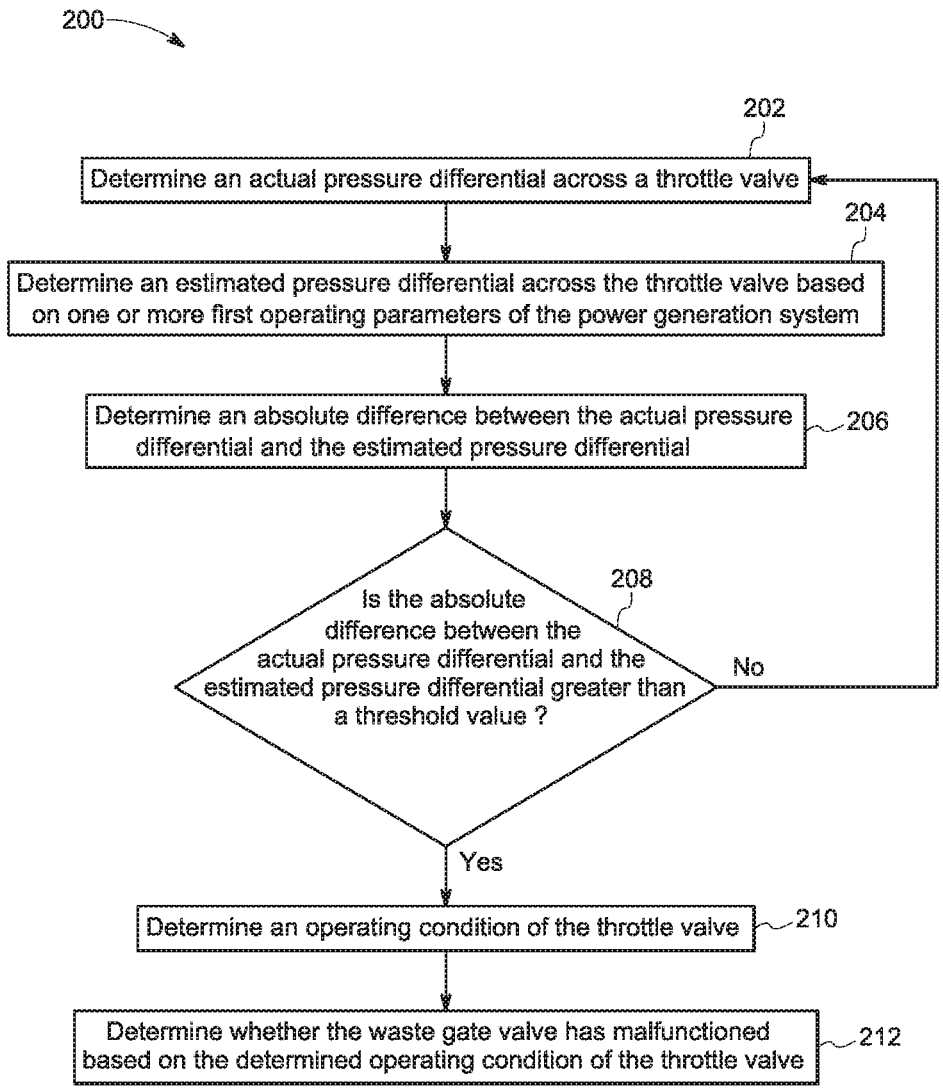
FIG. 2 depicts a flowchart illustrating a method for diagnosing a waste gate valve malfunction in the power generation system of FIG. 1, in accordance with one embodiment of the invention.

In some embodiments of the invention, the processor-executable routines, when executed by the processor 124 may cause the acts to be performed. The acts to be performed may include steps illustrated in flowcharts of FIGS. 2-5. FIG. 2 depicts a flowchart illustrating a method 200 for diagnosing the waste gate valve malfunction in the power generation system 100 of FIG. 1, in accordance with one embodiment of the invention. As illustrated in FIG. 2, in some embodiments of the invention, the method 200 may include steps 202-212. The processor-executable routines, when executed by the processor 124, may cause the processor 124 to perform acts indicated by the steps 202-212 of the method 200.

Referring now to FIGS. 1 and 2, in some embodiments of the invention, the method 200 includes determining an actual pressure differential ($\Delta P_{actual}$) across the throttle valve 112 at step 202. In some embodiments of the invention, to aid in the determination of the actual pressure differential ($\Delta P_{actual}$) across the throttle valve 112, the power generation system 100 may optionally further include a pre-throttle pressure sensor 128 and a post-throttle pressure sensor 130. The pre-throttle pressure sensor 128 may be disposed upstream of the throttle valve 112. In a non-limiting example, the pre-throttle pressure sensor 128 may be disposed in a flow path between the compressor output and the throttle valve 112. The post-throttle pressure sensor 130 may be disposed downstream of the throttle valve 112. In a non-limiting example, the post-throttle pressure sensor 130 may be disposed in a flow path between the throttle valve 112 and the combustion engine 102.

The pre-throttle pressure sensor 128 and the post-throttle pressure sensor 130 may generate electric signals that are indicative of pressures of the pressurized air stream 10 upstream and downstream, respectively, of the throttle valve 112. In some embodiments of the invention, the actual pressure differential ($\Delta P_{actual}$) across the throttle valve 112 may be determined by the processor 124 based on the electric signals generated by the pre-throttle pressure sensor 128 and the post-throttle pressure sensor 130. In some embodiments of the invention, determining the actual pressure differential ($\Delta P_{actual}$) across the throttle valve 112 includes performing the steps of a method of FIG. 3.

Figure 3:
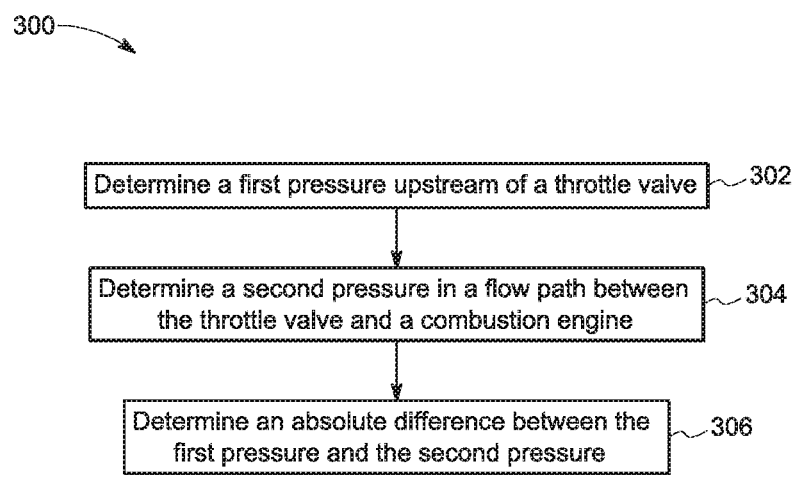
FIG. 3 depicts a flowchart illustrating a method for determining an actual pressure differential across a throttle valve, in accordance with one embodiment of the invention.

FIG. 3 depicts a flowchart illustrating a method 300 for determining the actual pressure differential ($\Delta P_{actual}$) across the throttle valve 112 (for example, a method for performing step 202 of method 200), in accordance with one embodiment of the invention. As illustrated in FIG. 3, in some embodiments of the invention, the method 300 may include steps 302-306. The processor-executable routines, when executed by the processor 124, may cause the processor 124 to perform acts indicated by the steps 302-306 of the method 300.

Referring now to FIGS. 1 and 3, in some embodiments of the invention, at step 302, the method 300 includes determining a first pressure ($P_1$) upstream of the throttle valve 112. In a non-limiting example, the first pressure ($P_1$) may be a pressure of the pressurized air stream 10 at an outlet of the intercooler 113. As noted previously, the power generation system 100 includes the pre-throttle pressure sensor 128. The pre-throttle pressure sensor 128 generates an electric signal indicative of the first pressure ($P_1$). The electric signal generated by the pre-throttle pressure sensor 128 may be received by the engine controller 114. Accordingly, the processor 124 of the engine controller 114 may then determine the first pressure ($P_1$) based on the properties (for example, amplitude, frequency, phase, pattern, or combinations thereof) of the electric signal received from the pre-throttle pressure sensor 128.

Similarly, in some embodiments of the invention, at step 304, the method 300 includes determining a second pressure ($P_2$) in a flow path between the throttle valve 112 and the combustion engine 102. The second pressure ($P_2$) may be a pressure of the pressurized air stream 10 in the flow path between the throttle valve 112 and the combustion engine 102. In a non-limiting example, the second pressure ($P_2$) may be a pressure of the pressurized air stream 10 in the intake manifold 104 disposed downstream of the throttle valve 112.

As previously noted, the power generation system 100 includes the post-throttle pressure sensor 130. The post-throttle pressure sensor 130 generates an electric signal indicative of the second pressure ($P_2$). The electric signal generated by the post-throttle pressure sensor 130 may be received by the engine controller 114. Accordingly, the processor 124 of the engine controller 114 may then determine the second pressure ($P_2$) based on the properties (for example, amplitude, frequency, phase, pattern, or combinations thereof) of the electric signal received from the post-throttle pressure sensor 130.

Further, the method 300 may include determining an absolute difference ($\Delta P$) between the first pressure ($P_1$) and the second pressure ($P_2$) at step 306. In some embodiments of the invention, the processor 124 may determine the absolute difference between the first pressure ($P_1$) and the second pressure ($P_2$) by subtracting the first pressure ($P_1$) from the second pressure ($P_2$), or vice versa. In certain embodiments of the invention, the absolute difference ($\Delta P$) between the first pressure ($P_1$) and the second pressure ($P_2$) may represent the actual pressure differential ($\Delta P_{actual}$) across the throttle valve 112. In a non-limiting example, the absolute difference ($\Delta P$), and hence, the actual pressure differential ($\Delta P_{actual}$) across the throttle valve 112, may be represented using one of the following equations 3 and 4:

$$\Delta P = \Delta P_{actual} = |P_2 - P_1| \tag{3}$$

$$\Delta P = \Delta P_{actual} = |P_1 - P_2| \tag{4}$$

Turning now to FIG. 2, in some embodiments of the invention, the method 200 includes determining an estimated pressure differential ($\Delta P_{est}$) across the throttle valve 112 based on one or more first operating parameters of the power generation system 100, at step 204. The first operating parameters of the power generation system 100 may include, but are not limited to, an ambient temperature, an ambient pressure, an intercooler temperature, an engine speed, an engine load, humidity content in a gas stream 60 to be emitted from the power generation system 100, or combinations thereof.

In some embodiments of the invention, the power generation system 100 may optionally include one or more of an ambient temperature sensor 132, an ambient pressure sensor 134, an intercooler temperature sensor 136, and a humidity sensor 138 to generate electric signals indicative of the ambient temperature, the ambient pressure, the intercooler temperature, and the humidity content in the gas stream 60, respectively. The ambient temperature sensor 132, the ambient pressure sensor 134, the intercooler temperature sensor 136, and the humidity sensor 138 if present may be communicatively coupled to the engine controller 114 to communicate the respective generated electric signals to the engine controller 114. Accordingly, the processor 124 of the engine controller 114 may determine values of the ambient temperature, the ambient pressure, the intercooler temperature, and the humidity content in the exhaust gas stream 20, based on the electric signals received from one or more of these sensors. Furthermore, the processor 124 may determine one or more of the engine speed (in revaluations per minute (rpm)) and the engine load (kW) by monitoring operation of the combustion engine 102.

Moreover, in some embodiments of the invention, the processor 124 may maintain a first look-up table or a first physics based model indicative of a relationship between the one or more of the first operating parameters and corresponding values of estimated pressure differential ($\Delta P_{est}$) across the throttle valve 112. In a non-limiting example, the first look-up table may contain values of the estimated pressure differential ($\Delta P_{est}$) for each combination of the values of the ambient temperature, the ambient pressure, the intercooler temperature, the engine speed, the engine load, and the humidity content in the gas stream 60. Accordingly, the step of determining the estimated pressure differential ($\Delta P_{est}$) across the throttle valve 112 by the processor 124 may include using the first look-up table or the first physics based model and the one or more first operating parameters.

In some embodiments of the invention, the method 200, at step 206, further includes determining an absolute difference ($\Delta PD$) between the actual pressure differential ($\Delta P_{actual}$) (determined at step 204) and the estimated pressure differential ($\Delta P_{est}$) (determined at step 204). The absolute difference ($\Delta PD$) between the actual pressure differential ($\Delta P_{actual}$) and the estimated pressure differential ($\Delta P_{est}$) may be determined by the processor 124 by subtracting the actual pressure differential ($\Delta P_{actual}$) from the estimated pressure differential ($\Delta P_{est}$), or vice versa. In a non-limiting example, the absolute difference ($\Delta PD$) may be represented using one of the following equations 1 and 2:

$$\Delta PD = |\Delta P_{est} - \Delta P_{actual}| \quad (1)$$

$$\Delta PD = |\Delta P_{actual} - \Delta P_{est}| \quad (2)$$

Also, in some embodiments of the invention, the method 200 includes comparing the absolute difference ($\Delta PD$) with a threshold value at step 208. Accordingly, a check may be performed at 208 to determine if the absolute difference ($\Delta PD$) between the actual pressure differential ($\Delta P_{actual}$) and the estimated pressure differential ($\Delta P_{est}$) is greater than the threshold value. Performing the check at step 208 may include comparing the absolute difference ($\Delta PD$) with the threshold value. The threshold value may be indicative of an allowable deviation (e.g., difference) between the actual pressure differential ($\Delta P_{actual}$) and the estimated pressure differential ($\Delta P_{est}$). In some embodiments of the invention, the threshold value may be predefined, for example, by an operator, technician, or manufacturer of the power generation system 100 or the engine controller 114. The threshold value may be stored in the memory 126. In one non-limiting example, the threshold value may be 0 (zero), which indicates that the actual pressure differential ($\Delta P_{actual}$) and the estimated pressure differential ($\Delta P_{est}$) are the same. As mentioned earlier, if the actual pressure differential ($\Delta P_{actual}$) and the estimated pressure differential ($\Delta P_{est}$) are different, this indicates that at least one of one the throttle valve 112 and the waste gate valve 110 has malfunctioned. Therefore, in such a scenario if it is determined that the throttle valve 112 is functioning normally this indicates that the waste gate valve 110 has malfunctioned. If the throttle valve 112 is functioning abnormally, in this scenario it is unknown whether the waste gate valve 110 has malfunctioned. In another non-limiting example, the threshold value may be greater than 0 to allow for certain deviation between the actual pressure differential ($\Delta P_{actual}$) and the estimated pressure differential ($\Delta P_{est}$).

If at step 208 it is determined that the absolute difference (API)) between is lower than the threshold value, as shown in FIG. 2, the method 200 may include looping back to step 202. However, if at step 208, it is determined that the absolute difference ($\Delta PD$) is greater than the threshold value, the method may further include performing step 210.

In some embodiments of the invention, the absolute difference ($\Delta PD$) being greater than the threshold value is indicative of malfunctioning of at least one of the waste gate valve 110 and the throttle valve 112. Accordingly, to determine whether the waste gate valve 112 has malfunctioned, it is desirable to determine the operating condition of the throttle valve 112 in situations when electronic sensors for detection of malfunction of the waste gate valve 110 are not employed. Therefore, the method 200, at step 210, in some embodiments of the invention, includes determining an operating condition of the throttle valve 112. The operating conditions of the throttle valve 112 may be a normal operating condition or an abnormal operation condition. In the normal operating condition, the throttle valve 112 may operate in a known fashion corresponding to given engine load (kW) and engine speed (rpm), in the abnormal operating condition, the throttle valve 112 may not operate in accordance with the given engine load (kW) and the engine speed (rpm).

To aid in the determination of the operating condition of the throttle valve 112, the power generation system 100 may optionally include a throttle valve sensor 140. The throttle valve sensor 140 may be disposed within the throttle valve 112 or proximate to the throttle valve 112. The throttle valve sensor 140 may generate an electric signal indicative of an actual open position or percentage opening of the throttle valve 112. The electric signal generated by the throttle valve sensor 140 may be received by the engine controller 114. In one embodiment of the invention, the processor 124 of the engine controller 114 may determine the operating condition of the throttle valve 112 based at least on the electric signal received from the throttle valve sensor 140. For example, at step 210, the processor 124 may determine that the throttle valve 112 operates in either the normal operating condition or in the abnormal operating condition. Further details of determining the operating condition of the throttle valve 112 are described in conjunction with a method of FIG. 4.

Figure 4:
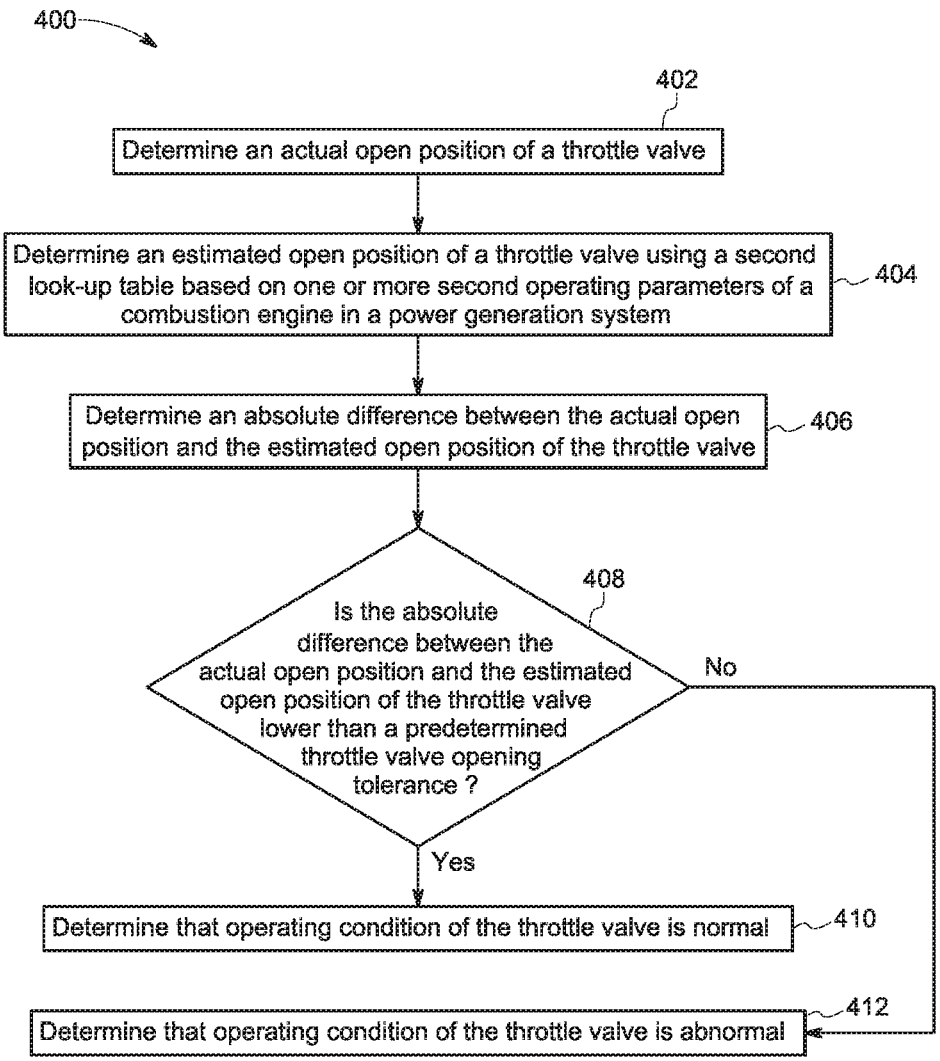
FIG. 4 depicts a flowchart illustrating a method for determining an operating condition of a throttle valve, in accordance with one embodiment of the invention.

FIG. 4 depicts a flowchart illustrating a method 400 for determining the operating condition of the throttle valve 112 (for example, a method for performing step 210 of method 200), in accordance with one embodiment of the invention. As illustrated in FIG. 4, in some embodiments of the invention, the method 400 may include steps 402-412. The processor-executable routines, when executed by the processor 124, may cause the processor 124 to perform acts indicated by the steps 402-412 of the method 400.

Referring now to FIGS. 1 and 4, in some embodiments of the invention, at step 402, the method 400 includes determining the actual open position ($OP_{actual}$) of the throttle valve 112. As previously noted, the power generation system 100 may include the throttle valve sensor 140 that generates an electric signal that is indicative of the actual open position ($OP_{actual}$) of the throttle valve 112. The electric signal generated by the throttle valve sensor 140 may be received by the engine controller 114. Accordingly, the processor 124 of the engine controller 114 may then determine the actual open position ($OP_{actual}$) of the throttle valve 112 based on the properties (for example, amplitude, frequency, phase, pattern, or combinations thereof) of the electric signal received from the throttle valve sensor 140.

Further, in some embodiments of the invention, at step 404, the method 400 includes determining an estimated open position ($OP_{est}$) of the throttle valve 112 using a second look-up table or a second physics based model based on one or more second operating parameters of the combustion engine 102 in the power generation system 100. In one embodiment of the invention, the second operating parameters may be a subset of the first operating parameters. Non-limiting examples of the second operating parameters of the combustion engine 102 may include the engine load (kW), the engine speed (rpm), or a combination thereof. As previously noted, the processor 124 may determine the engine load (kW) and the engine speed (rpm) by monitoring operation of the combustion engine 102.

The processor 124 may maintain the second look-up table or the second physics based model indicative of a relationship between the one or more of the second operating parameters and corresponding values of the estimated open position ($OP_{est}$) of the throttle valve 112. In a non-limiting example, the second look-up table may contain values of the estimated open position ($OP_{est}$) of the throttle valve 112 for each combination of the values of the engine load (kW) and the engine speed (rpm). Accordingly, the processor 124 may determine the estimated open position ($OP_{est}$) of the throttle valve 112 by using the second look-up table or the second physics based model and one or both of the engine load (kW), and the engine speed (rpm).

Further, the method 400, at step 406, may include determining an absolute difference ($\Delta OP$) between the actual open position ($OP_{actual}$) (determined at step 402) and the estimated open position ($OP_{est}$) (determined at step 404) of the throttle valve 112. In some embodiments of the invention, the processor 124 may determine the absolute difference ($\Delta OP$) by subtracting the actual open position ($OP_{actual}$) from the estimated open position ($OP_{est}$), or vice versa. In a non-limiting example, the absolute difference ($\Delta OP$) may be represented using one of the following equations 5 and 6:

$$\Delta OP = |OP_{est} - OP_{actual}| \quad (5)$$

$$\Delta OP = |OP_{actual} - OP_{est}| \quad (6)$$

Furthermore, the method 400, at step 408, may include performing a check to determine if the absolute difference ($\Delta OP$) between the actual open position ($OP_{actual}$) and the estimated open position ($OP_{est}$) of the throttle valve 112 is lower than a predetermined throttle valve opening tolerance. Performing the check at step 408 may include comparing the absolute difference ($\Delta OP$) with the predetermined throttle valve opening tolerance. The predetermined throttle valve opening tolerance may be indicative of an allowable range of opening positions of the throttle valve 112 for given values of the engine load (kW), the engine speed (rpm), or combination thereof. In some embodiments of the invention, the predetermined throttle valve opening tolerance may be may be predefined, for example, by an operator, technician, or manufacturer of the power generation system 100 or the engine controller 114. In some alternative embodiments of the invention, the predetermined throttle valve opening tolerance may be determined by the processor 124. The predetermined throttle valve opening tolerance may be stored in the memory 126.

If at step 408, it is determined that the absolute difference ($\Delta OP$) is lower than the predetermined throttle valve opening tolerance, the method 400 may include performing step 410, that is, determining that the operating condition of the throttle valve is normal. However, if at step 408 it is determined that the absolute difference ($\Delta OP$) is greater than the predetermined throttle valve opening tolerance, the method 400 may include performing step 412, that is, determining that operating condition of the throttle valve 112 is abnormal. In some embodiments of the invention, the processor 124 may store an identifier indicative of the operating condition (for example, normal or abnormal) of the throttle valve 112 in the memory 126. The identifier may be in the form of an alphanumeric characters, word, or binary code, without limiting the scope of the embodiments of the invention.

Referring again to FIG. 2, in some embodiments of the invention, the method 200 further includes determining whether the waste gate valve 110 has malfunctioned based on the determined operating condition of the throttle valve, as mentioned earlier. Details of determining whether the waste gate valve 110 has malfunctioned, is described in conjunction with a method of FIG. 5.

Figure 5:
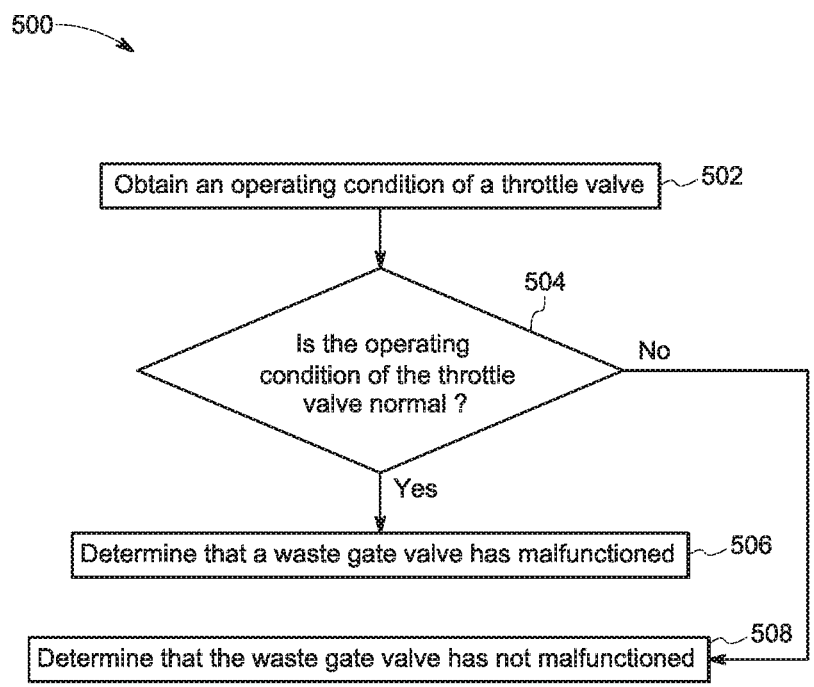
FIG. 5 depicts a flowchart illustrating a method for determining whether a waste gate valve has malfunctioned, in accordance with one embodiment of the invention.

FIG. 5 depicts a flowchart illustrating a method 500 for determining whether the waste gate valve 110 has malfunctioned (for example, a method for performing step 212 of method 200), in accordance with one embodiment of the invention. As illustrated in FIG. 5, in some embodiments of the invention, the method 500 may include steps 502-508. The processor-executable routines, when executed by the processor 124, may cause the processor 124 to perform acts indicated by the steps 502-508 of the method 500.

Referring now to FIGS. 1 and 5, in some embodiments of the invention, at step 502, the method 500 includes obtaining the operating condition of the throttle valve 112. The processor 124 may obtain the operating condition of the throttle valve 112 based on the identifier stored in the memory 126, in some embodiments.

Further, in some embodiments of the invention, the method 500, at step 504, includes performing a check to determine if the operating condition of the throttle valve 112 is normal. The processor 124 may determine the operating condition of the throttle valve 112 is normal by comparing the identifier stored in the memory 126 with a predefined identifier associated with the normal operating condition, in some embodiments. If the identifier stored in the memory 126 matches with the predefined identifier associated with the normal operating condition, it is determined that the operating condition of the throttle valve 112 is normal.

If at step 504, it is determined that the operating condition of the throttle valve 112 is normal, the method 500 may include determining that the waste gate valve 110 has malfunctioned at step 506, in some embodiments of the invention. However, if at step 504, it is determined that operating condition of the throttle valve 112 is abnormal, the method 500 may include determining that the waste gate valve 110 has not malfunctioned at step 508, in some embodiments of the invention.

In some embodiments of the invention, the method for diagnosing a waste gate valve malfunction may further include confirming whether the waste gate valve has malfunctioned by varying the one or more second operating parameters and repeating the steps 202-212 of FIG. 2. For example, one or both of the engine speed or engine load may be varied confirm whether the waste gate valve 110 has malfunctioned by repeating the steps 202-212 of FIG. 2. If it is again determined (at step 212) that the waste gate valve 110 has malfunctioned, the processor 124 may confirm that the waste gate valve 110 has malfunctioned.

The methods and engine controller according to some embodiments of the invention, aid in diagnosing a waste gate valve malfunction. Advantageously, a timely detection of the waste gate valve malfunction may be useful in determining corrective measures and actions expeditiously. Accordingly, engine performance, power output, and fuel economy may be improved. Moreover, the methods and the related engine controller according to some embodiments of the invention may be capable of diagnosing the waste gate valve malfunction without any specific sensors associated with the waste gate valve, thereby resulting in a reduced overall cost of the power generation system. Additionally, use of the waste gate valve in absence of the waste gate valve sensors may result in less complex assembly or manufacturing of the power generation system.

The present invention has been described in terms of some specific embodiments of the invention. They are intended for illustration only, and should not be construed as being limiting in any way. Thus, it should be understood that modifications can be made thereto, which are within the scope of the invention and the appended claims.

It will be appreciated that variants of the above disclosed and other features and functions, or alternatives thereof, may be combined to create many other different systems or applications. Different implementations of the systems and methods may perform some or all of the steps described herein in different orders, parallel, or substantially concurrently. Various unanticipated alternatives, modifications, variations, or improvements therein may be subsequently made by those skilled in the art and are also intended to be encompassed by the following claims.

What is claimed is:

1. A method for diagnosing a waste gate valve malfunction in a power generation system, comprising:
   (i) determining an actual pressure differential across a throttle valve;
   (ii) determining an estimated pressure differential across the throttle valve based on one or more first operating parameters of the power generation system;
   (iii) determining an absolute difference between the actual pressure differential and the estimated pressure differential; and
   (iv) comparing the absolute difference between the actual pressure differential and the estimated pressure differential with a threshold value, and, if the absolute difference between the actual pressure differential and the estimated pressure differential is greater than the threshold value,
      (a) determining an operating condition of the throttle valve; and
      (b) determining whether the waste gate valve has malfunctioned based on the determined operating condition of the throttle valve without any sensors associated with the waste gate valve, wherein determining whether the waste gate valve has malfunctioned enables the engine controller to determine one or more corrective measures for the power generation system.

2. The method of claim 1, comprising determining that the waste gate valve has malfunctioned if the operating condition of the throttle valve is normal.

3. The method of claim 1, wherein determining the actual pressure differential comprises:
   determining a first pressure upstream of the throttle valve;
   determining a second pressure in a flow path between the throttle valve and a combustion engine in the power generation system; and
   determining an absolute difference between the first pressure and the second pressure.

4. The method of claim 1, wherein determining the estimated pressure differential across the throttle valve comprises using a first look-up table or a first physics based model and the one or more first operating parameters, wherein the one or more first operating parameters comprise an ambient temperature, an ambient pressure, an intercooler temperature, an engine speed, an engine load, humidity content in a gas stream, or combinations thereof.

5. The method of claim 1, wherein determining the operating condition of the throttle valve comprises:
   determining an actual open position of the throttle valve;
   determining an estimated open position of the throttle valve using a second look-up table or a second physics based model based on one or more second operating parameters of a combustion engine in the power generation system; and
   determining an absolute difference between the actual open position and the estimated open position of the throttle valve and comparing the absolute difference between the actual open position and the estimated open position of the throttle valve with a determined throttle valve opening tolerance.

6. The method of claim 5, wherein if the absolute difference between the actual open position and the expected open position of the throttle valve is lower than the determined throttle valve opening tolerance, the operating condition of the throttle valve is determined to be normal.

7. The method of claim 5, wherein the one or more second operating parameters comprise an engine load, an engine speed, or a combination thereof.

8. The method of claim 5, further comprising confirming whether the waste gate valve has malfunctioned by varying the one or more second operating parameters and repeating steps (i) to (iv).

9. An engine controller for diagnosing a waste gate valve malfunction in a power generation system, comprising:
   a memory storing one or more processor-executable routines; and
   one or more processors to execute the one or more processor-executable routines which, when executed, cause acts to be performed comprising:
      determining an actual pressure differential across a throttle valve;
      determining an estimated pressure differential across the throttle valve based on one or more first operating parameters of the power generation system;
      determining an absolute difference between the actual pressure differential and the estimated pressure differential; and
      comparing the absolute difference between the actual pressure differential and the estimated pressure differential with a threshold value, and, if the absolute difference between the actual pressure differential and the estimated pressure differential is greater than the threshold value,
determining an operating condition of the throttle valve; and
determining whether the waste gate valve has malfunctioned based on the determined operating condition of the throttle valve without any sensors associated with the waste gate valve, wherein determining whether the waste gate valve has malfunctioned enables the engine controller to determine one or more corrective measures for the power generation system.

10. The engine controller of claim 9, wherein the acts to be performed comprise determining that the waste gate valve has malfunctioned if the operating condition of the throttle valve is normal.

11. The engine controller of claim 9, wherein the acts to be performed for determining the actual pressure differential across the throttle valve comprise:
determining a first pressure upstream of the throttle valve;
determining a second pressure in a flow path between the throttle valve and a combustion engine; and
determining an absolute difference between the first pressure and the second pressure.

12. The engine controller of claim 9, wherein the estimated pressure differential across the throttle valve is determined using a first look-up table or a first physics based model and the one or more first operating parameters, wherein the one or more first operating parameters comprise an ambient temperature, an ambient pressure, an intercooler temperature, an engine speed, an engine load, humidity content in a gas stream, or combinations thereof.

13. The engine controller of claim 9, wherein the acts to be performed for determining the operating condition of the throttle valve comprise:
determining an actual open position of the throttle valve;
determining an estimated open position of the throttle valve using a second look-up table or a second physics based model based on one or more second operating parameters of a combustion engine in the power generation system; and
determining an absolute difference between the actual open position and the estimated open position of the throttle valve and comparing the absolute difference between the actual open position and the estimated open position of the throttle valve with a determined throttle valve opening tolerance.

14. The engine controller of claim 13, wherein if the absolute difference between the actual open position and the expected open position of the throttle valve is lower than the determined throttle valve opening tolerance, the operating condition of the throttle valve is determined to be normal.

15. An apparatus, comprising:
an engine controller having a memory, a processor, and instructions stored on the memory and executable by the processor to control operation of an internal combustion engine having a waste gate valve and a throttle valve, wherein the instructions comprise:
instructions to indirectly identify a health of the waste gate valve via an analysis of an actual pressure differential across the throttle valve and one or more operating conditions of the throttle valve, wherein the health of the waste gate valve is normal if the actual pressure differential is acceptable based on a threshold value, wherein the health of the waste gate valve comprises a malfunction if the actual pressure differential is unacceptable based on the threshold value and if the one or more operating conditions indicate a normal condition of the throttle valve.

16. The apparatus of claim 15, wherein the instructions comprise instructions to determine one or more corrective measures for the internal combustion engine if the health of the waste gate valve comprises the malfunction.

17. The apparatus of claim 15, wherein the instructions comprise instructions to vary one or more operating parameters of the internal combustion engine and re-evaluate the health of the waste gate valve upon indirectly identifying the health as the malfunction.

18. The apparatus of claim 15, comprising the internal combustion engine having the engine controller.

19. The apparatus of claim 15, wherein the instructions comprise instructions to compare the threshold valve relative to an absolute difference between the actual pressure differential and an estimated pressure differential across the throttle valve.

20. The apparatus of claim 19, wherein the health of the waste gate valve is normal if the actual pressure differential is acceptable as indicated by the absolute difference being less than the threshold, wherein the health of the waste gate valve comprises the malfunction if the actual pressure differential is unacceptable as indicated by the absolute difference being greater than the threshold and if the one or more operating conditions indicate the normal condition of the throttle valve.

* * * * *